Nov. 7, 1933.  H. BLEIBTREU ET AL  1,933,699
FLUE GAS CLEANING APPARATUS
Filed Dec. 18, 1931   2 Sheets-Sheet 1
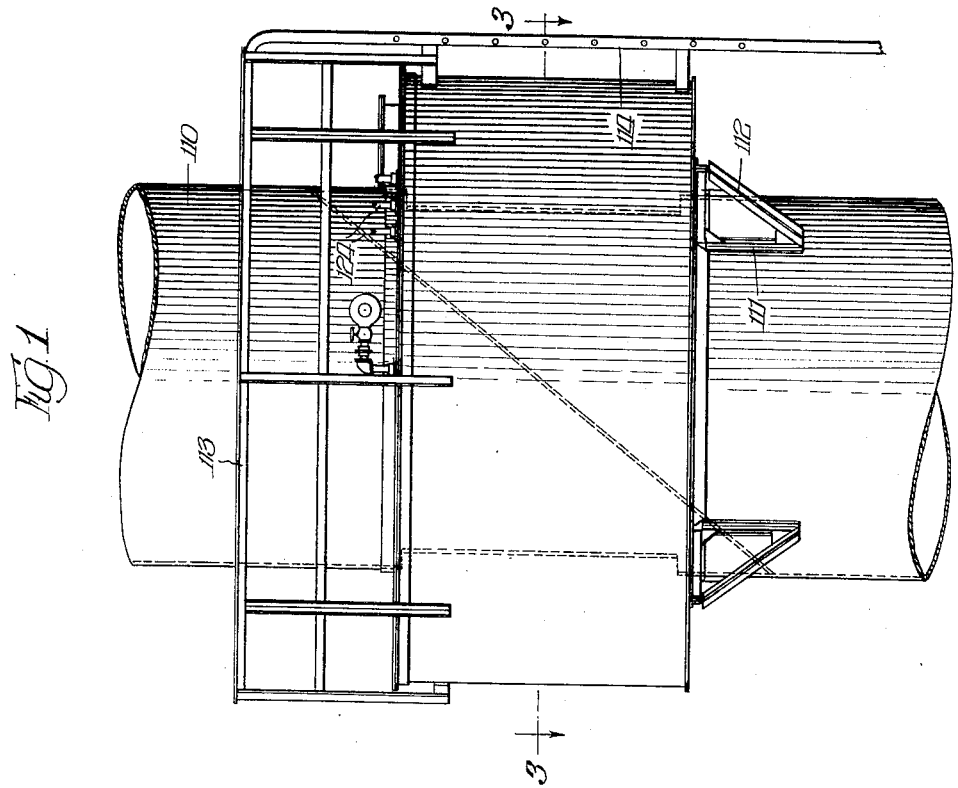
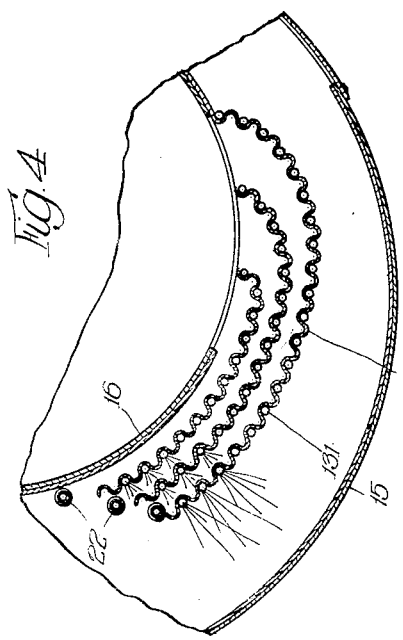
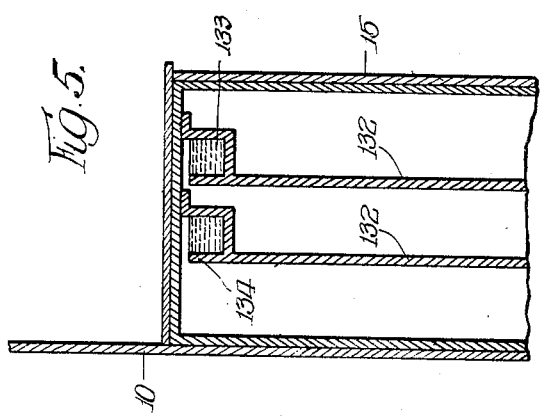
Inventors:
Herman Bleibtreu,
John B. Eberlein,

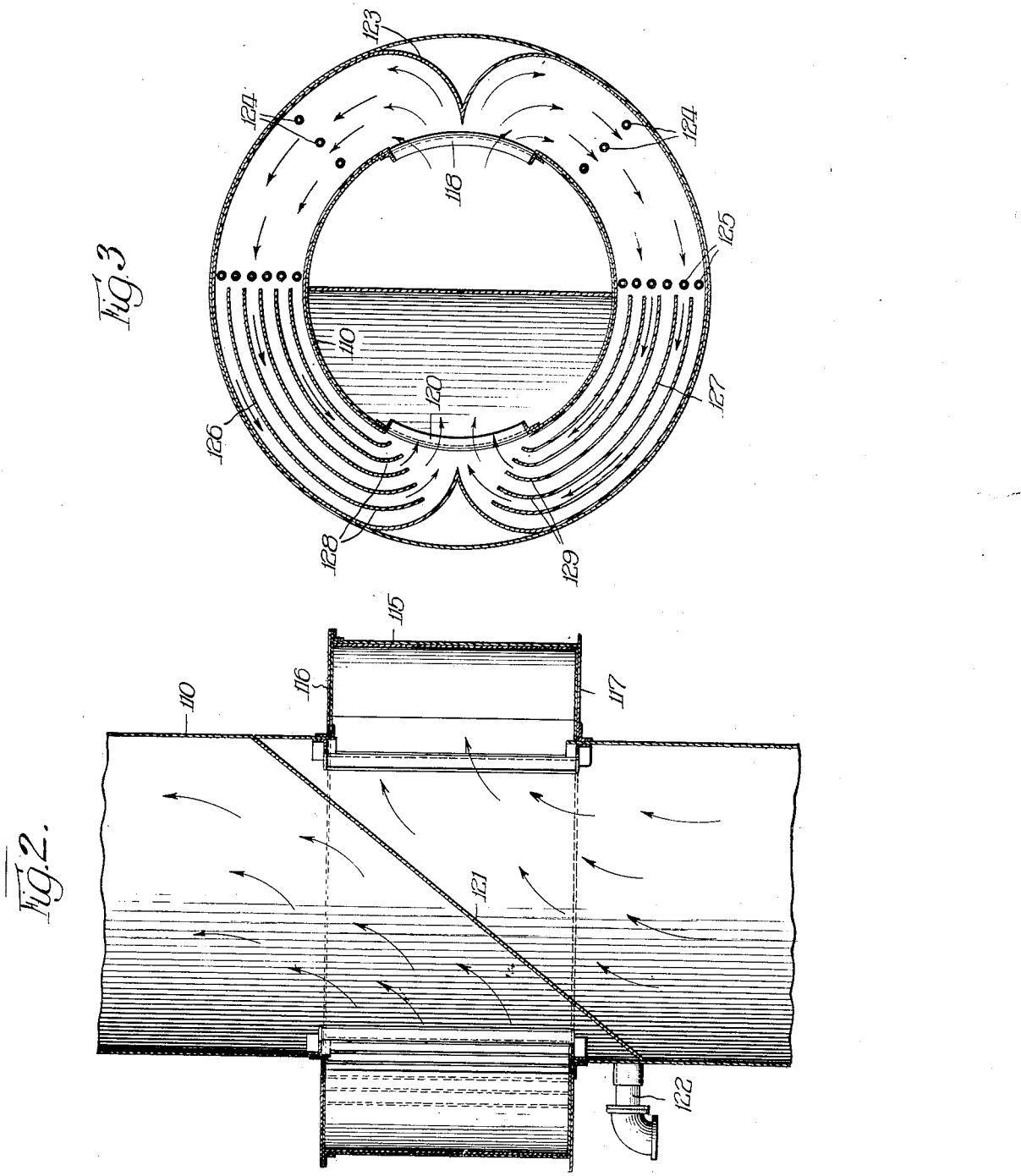

Patented Nov. 7, 1933

1,933,699

UNITED STATES PATENT OFFICE 1,933,699

FLUE GAS CLEANING APPARATUS REISSUED

Hermann Bleibtreu and John B. Eberlein, Chicago, Ill., assignors to Freyn Engineering Company, Chicago, Ill., a corporation of Maine Application December 18, 1931
Serial No. 581,850

7 Claims. (Cl. 183—22)

The invention relates to gas washing apparatus and has reference particularly to an improved washer for flue gases.

An object of the invention is to provide a washer for flue gases which will employ water as a washing medium and wherein the washing effect will be accomplished without seriously affecting the travel of the gases through the stack.

Another object of the invention is to provide a washer which will separate the main gas stream delivered thereto into a plurality of smaller streams so as to increase the surface subjected to contact by the gas and cause the solid particles carried along in the individual streams to separate therefrom, the effect being secured by directing the gas through a spiral or circular housing.

Another object of the invention is the provision of rubber partitions for forming the passages in the housing. Also the invention contemplates lining the inner walls of the apparatus with rubber so that the device will resist the corrosive and abrasive effect of the solid particles in the gas.

A further object is to provide washing apparatus which will divide the gas stream delivered thereto into a number of smaller streams by means of a number of passages, each being designed to change its direction of flow and to produce a centrifugal force on the solid particles carried by the streams. The whirling action of the gas stream and the increased surface presented for contact by the gas insures that the smaller and lighter particles as well as the heavier ones will be subjected to contact with the surfaces and will separate from the gases.

A further object is to provide a washer which will function under all conditions with a high efficiency and it is immaterial whether operation is conducted on a reduced volume of gas with corresponding low pressure or on maximum gas volume and high pressure.

With these and various other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts—

Figure 1 is an elevational view of another type of washer showing the same in associated relation with a flue stack;

Figure 2 is a vertical sectional view taken through the structure shown in Figure 1;

Figure 3 is a sectional view taken substantially on line 3—3 of Figure 1;

Figure 4 is a detail sectional view showing a modified arrangement of partitions, and Figure 5 is a horizontal detail view showing another modified structure for the partitions and which permits one surface thereof to be continuously supplied with water.

In Figures 1, 2 and 3 a flue gas washer is disclosed adapted for location intermediate the stack and which functions to intercept the gases in their travel vertically of the stack. The structure consists of a circular housing supported upon the stack 110 by vertical supporting members 111 and braces 112 and is provided with a railing 113 enclosing the upper wall and a vertical ladder 114 providing access to the valves by which the spray of water is controlled.

More particularly the circular housing consists of an outer wall 115, top and bottom walls 116 and 117, respectively, and an inner wall formed by the stack 110. An inlet 118 is located in one side of the wall of the stack and extends the height of the washer while diametrically opposite the inlet is an outlet 120 of substantially the same width and height. For separating the inlet from the outlet and to cause the gases to travel from the inlet through the housing to the outlet a dividing partition 121 is positioned diagonally in the stack 110 and extends from a point above the inlet to a point below the outlet where the stack is provided with a drain 122.

The housing by reason of its contour provides two semi-circular passages for the gases, the same being diverted by arcuate walls 123 located opposite the inlet 118 toward the water nozzles 124. The nozzles are supported in the top wall 116 and are suitably connected to water supply pipes so as to form water sprays for initially washing the gas. Additional water nozzles 125 are provided, being located in advance of sets of partitions 126 and 127, respectively, which divide the main stream flowing through the housing into a number of individual streams to provide increased surfaces for contact with the gases. The partitions are arcuate for the greater portion of their length, having terminal ends of more determined curvature such as 128 and 129, respectively, the same terminating adjacent the outlet for the housing.

In operation of the above type of washer the gases are subjected to a preliminary washing by passing through the water sprays and are then given a whirling motion by the curvature of the partitions, the effect of centrifugal force on the solid particles carried along in the gas streams, causing them to contact the wet surfaces and to separate from the gases. The curvature of the partitions is such as to change the direction of flow of the streams and to also impart a baffling effect to the gases, the latter being accomplished by the abrupt curve at the terminal portions of the partitions. The surfaces are maintained in wet condition by reason of the gases first having passed through the water sprays and the solid particles are caused, by reason of the moisture, to adhere to the surfaces and to thus separate from the streams. As the gases are impeded in their travel by the abrupt curves at the end of the partitions their velocity is greatly decreased to cause the solid particles to drop by gravity so that the gases when delivered to the outlet have, by the combined action of the water spray and partitions, been thoroughly cleaned. The slurry from the washer is collected adjacent the outlet 120 and is conducted by drain 122 to settling tanks and the like.

In order to insure a constant supplying of water for the partitions the same can be corrugated as at 130, Figure 4, with vertical water pipes 131 being positioned in the vertical grooves formed by the partitions and serving to direct streams of water toward the outer surfaces either of the washer or of the outer adjacent partitions. This construction also has the advantage of increasing the surfaces subjected to contact by the gases and as the same are continuously washed by the water sprays the solid particles when brought into engagement are readily united with the water and conducted from the washer as slurry.

According to the invention the partitions are formed of rubber and also the inner walls of the housing are lined with rubber in order to provide the greatest resistance to corrosion and to the abrasive effects of the solid particles in the gases. Rubber effectively resists the action of sulphuric acid generated by the water and the sulphur dioxide in the gas and also effectively withstands the continual wear caused by the solid matter.

A modified arrangement is shown in Figure 5 for supplying the outer surfaces of the partitions with sufficient water. The members 132 are formed adjacent their upper portion with a horizontal trough 133 supplied with water so that an overflow occurs over the edge 134. This overflow maintains a constant stream of water along the outer walls of the partition against which the solid particles are thrown by the whirling motion of the gases.

The above type of washer is known as a stationary washer and although comparatively cheap in operation eliminates to a great extent the foreign matter carried by the gases. The present apparatus has been found particularly efficient in connection with the cleaning of flue gases which is accomplished without seriously affecting the travel of the gases through the stack.

It is to be understood that we do not wish to be limited by the exact embodiment of the device shown, which is merely by way of illustration and not limitation, as various and other forms of the device will of course be apparent to those skilled in the art without departing from the spirit of the invention or the scope of the claims.

We claim:

1. In a gas washer, in combination, a substantially circular housing having top, bottom and inner and outer connecting side walls, an inlet and outlet provided in the inner of said walls at diametrically opposed points, a dividing wall extending from the top of the inner wall above the inlet to the base below the outlet and separating the inlet from the outlet, said inlet and outlet being connected by passages provided by the housing, partitions located in the passages, and spray nozzles in the passages between the inlet and the partitions.

2. In washing apparatus for association with a stack for conducting flue gases, a circular housing having an outer wall concentric with the stack, an inlet from the stack to the housing, and an outlet at a point removed therefrom, a dividing wall in the stack separating the inlet from the outlet, said inlet and outlet having communication through passages provided by the housing, and partitions located in the passages.

3. In washing apparatus for association with a stack for conducting flue gases, a circular housing having an outer wall concentric with the stack, an inlet from the stack to the housing, and an outlet at a point removed therefrom, a dividing wall in the stack separating the inlet from the outlet, said inlet and outlet having communication through passages provided by the housing, partitions located in the passages and terminating adjacent the outlet, and nozzles projecting into the passages for providing water sprays.

4. In a gas washer, in combination, a housing having top, bottom and inner and outer connecting side walls, said side walls being substantially concentric, an inlet and an outlet for the housing located in the inner wall at remote points, a dividing partition in the inner wall extending diagonally thereof and separating the inlet and the outlet excepting through the passages formed by the housing, and a plurality of partitions of curvilinear configuration located in the housing to the respective sides of the outlet therein for effecting a turbulence of the gases flowing through the housing to clean the gases prior to their discharge.

5. In a gas washer, in combination, a housing of substantially circular shape having top, bottom and inner and outer connecting side walls, an inlet and outlet in the inner wall thereof at divergent points, a dividing partition in the inner wall extending from a point above the outlet to a point below the inlet separating the inlet and outlet excepting through the housing, a plurality of curvilinear passageways formed in the housing to the respective sides of the outlet thereof for effecting a turbulence of the gases flowing through the housing, and means in the housing for washing the gases in advance of their flow through the curvilinear passageways.

6. A gas washer for association with a flue stack, comprising a housing having the stack providing the inner wall thereof and an outer wall substantially concentric with the inner wall, a plurality of openings in the inner wall at divergent points and communicating with the housing, means in the stack adjacent the housing for intercepting the flue gases flowing in the stack and for diverting the gases through one of said openings, whereby said gases are caused to flow through the housing and to be discharged from said other opening before again entering the stack, and gas washing means in said housing for cleaning the gases flowing therethrough.

7. A gas washer for association with a flue stack, comprising a housing having the stack providing the inner wall thereof and an outer wall substantially concentric with the inner wall, a plurality of openings in the inner wall at divergent points and communicating with the housing, means in the stack adjacent the housing for intercepting the flue gases flowing in the stack and for diverting the gases through one of said openings, whereby said gases are caused to flow through the housing and to be discharged from said other opening before again entering the stack, curvilinear passageways in the housing for dividing the gases into a number of small streams and for causing a turbulence of said individual streams, and water sprays in the housing in advance of said passageways.

HERMANN BLEIBTREU.
JOHN B. EBERLEIN.